United States Patent
Shimada et al.

(10) Patent No.: US 11,417,360 B1
(45) Date of Patent: Aug. 16, 2022

(54) TAPE SUPPORT SYSTEM WITH A LOAD-UNLOAD MECHANISM

(71) Applicant: Western Digital Technologies, Inc., San Jose, CA (US)

(72) Inventors: Minoru Shimada, Yokohama (JP); Masahito Kobayashi, Fujisawa (JP); Kenji Kuroki, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/351,666

(22) Filed: Jun. 18, 2021

(51) Int. Cl.
*G11B 15/32* (2006.01)
*G11B 17/34* (2006.01)
*G11B 5/012* (2006.01)

(52) U.S. Cl.
CPC .............. *G11B 17/34* (2013.01); *G11B 5/012* (2013.01)

(58) Field of Classification Search
CPC ..... G11B 15/60; G11B 5/00813; G11B 5/581; G11B 5/60; G11B 15/32; G11B 5/255; G11B 5/008; G11B 5/1871; G11B 5/31; G11B 15/28; G11B 5/56; G11B 5/10
USPC .................................. 360/75, 95, 96.1, 96.3
See application file for complete search history.

(56) References Cited

U.S. PATENT DOCUMENTS

| | | | |
|---|---|---|---|
| 5,870,924 A * | 2/1999 | Fahimi | G11B 23/08757 72/379.2 |
| 6,565,028 B2 | 5/2003 | Sasaki et al. | |
| 6,714,381 B2 | 3/2004 | Willems, Jr. | |
| 6,886,766 B1 | 5/2005 | Weng et al. | |
| 7,195,189 B2 * | 3/2007 | Biskeborn | G11B 15/56 242/332.1 |
| 7,261,250 B1 | 8/2007 | Underkofler et al. | |
| 7,609,475 B2 | 10/2009 | Biskeborn et al. | |
| 2004/0001284 A1 | 1/2004 | Nayak et al. | |
| 2005/0201016 A1 * | 9/2005 | Komai | G11B 5/584 360/251.1 |

(Continued)

OTHER PUBLICATIONS

Raeymaekers, Bart, et al.—"A Model for Magnetic Tape/Guide Friction Reduction by Laser Surface Texturing," Tribology Letters, vol. 28, 2007, pp. 9-17.

(Continued)

*Primary Examiner* — Nabil Z Hindi
(74) *Attorney, Agent, or Firm* — Patterson + Sheridan, LLP; Steven H. VerSteeg

(57) ABSTRACT

The present disclosure generally relates to a magnetic recording device having a magnetic recording media guide support system with a load-unload mechanism. The magnetic recording media guide is positioned between the magnetic head assembly and at least one guide roller, and moves a magnetic recording media surface closer to and further from the magnetic head assembly. The magnetic recording media guide is movable in a direction perpendicular to a direction that the magnetic recording media moves past the magnetic head assembly. The magnetic recording media guide is stationary in relation to the magnetic recording media when the magnetic recording media moves past the magnetic head assembly while a magnetic head is positioned to read data from or write data to the magnetic recording media. Additionally, the magnetic recording media guide can planarize the magnetic recording media surface on the magnetic head.

20 Claims, 7 Drawing Sheets

(56) References Cited

U.S. PATENT DOCUMENTS

2008/0068753 A1    3/2008   Biskeborn et al.

OTHER PUBLICATIONS

Hayes, Thomas George Hayes IV—"Effect of Magnetic Tape Thickness on Durability and Lateral Tape Motion Measurement and Modeling in a Linear Tape Drive," a Thesis presented in the Graduate School of The Ohio State University, 2006, 129 pages.

* cited by examiner

TAPE SUPPORT SYSTEM WITH A LOAD-UNLOAD MECHANISM

BACKGROUND OF THE DISCLOSURE

Field of the Disclosure

Embodiments of the present disclosure generally relate to a magnetic recording device having a tape support system with a load-unload mechanism.

Description of the Related Art

A magnetic recording device is a system for storing digital information on magnetic media using digital recording. Magnetic recording media is more commonly packaged in cartridges and cassettes as hard disk drives (HDDs) or tape drives. A magnetic recording drive performs writing or reading of data in cartridges or cassettes. A common cassette-based format is linear tape open (LTO).

Magnetic recording devices operate by using a magnetic head to record and read back information from magnetic recording media by magnetic processes. In tape drive operation, the magnetic head and magnetic recording media are typically in constant contact with each other. The contact causes wear to the magnetic head and the magnetic recording media. To aid in the wear, a lubricant layer is oftentimes disposed on the magnetic recording media. The magnetic recording media may become deformed, stretch, and/or move. Thus, the magnetic media may not properly align with the magnetic head during read and/or write operations.

To improve recording density of the magnetic recording media it is oftentimes necessary to reduce the thickness of the magnetic recording media and lubricant thickness to decrease the magnetic spacing between the magnetic recording media and the magnetic head. However, thickness of the magnetic recording media cannot be reduced when the magnetic head and magnetic recording media are in constant contact with each other.

Therefore, there is a need in the art for an improved magnetic media device to reduce wear to the magnetic head and magnetic recording media.

SUMMARY OF THE DISCLOSURE

The present disclosure generally relates to a magnetic recording device having a magnetic recording media guide support system with a load-unload mechanism. The magnetic recording media guide is positioned between the magnetic head assembly and at least one guide roller, and moves a magnetic recording media surface closer to and further from the magnetic head assembly. The magnetic recording media guide is movable in a direction perpendicular to a direction that the magnetic recording media moves past the magnetic head assembly. The magnetic recording media guide is stationary in relation to the magnetic recording media when the magnetic recording media moves past the magnetic head assembly while a magnetic head is positioned to read data from or write data to the magnetic recording media. Additionally, the magnetic recording media guide can planarize the magnetic recording media surface on the magnetic head.

In one embodiment, a magnetic recording device comprises: a reel configured to unroll a magnetic recording media therefrom or roll the magnetic recording media thereto; a magnetic head assembly configured to read data from the magnetic recording media or write data to the magnetic recording media; at least one guide roller rotatable about an axis and configured to guide the magnetic recording media past the magnetic head assembly; and at least one magnetic recording media guide disposed between the magnetic head assembly and the at least one guide roller, wherein the at least one magnetic recording media guide is configured to move between a first position to space the magnetic recording media from the magnetic head assembly and a second position to permit the magnetic recording media to be in contact with the magnetic head assembly.

In another embodiment, a magnetic recording device comprises: a tape media for storing data; a tape head for reading data from or writing data to the tape media; a guide roller configured to rotate about an axis, wherein the tape media is stationary relative to the guide roller when the guide roller rotates about the axis; and a tape guide disposed between the guide roller and the tape head, wherein the tape guide is stationary relative to the tape media when the tape media moves past the tape head while the tape head is positioned to read data from or write data to the tape media.

In another embodiment, a magnetic recording device, comprises: an enclosure; at least one tape reel disposed within the enclosure, wherein the at least one tape reel is configured to wind a tape media thereto or unwind a tape media therefrom; a tape head for reading data from the tape media or writing data to the tape media; and means to planarize the tape media on the tape head, wherein the means to planarize the tape media on the tape head is disposed between the at least one tape reel and the tape head.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments.

Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording device having a magnetic recording media guide support system with a load-unload mechanism. The magnetic recording media guide is positioned between the magnetic head assembly and at least one guide roller, and moves a magnetic recording media surface closer to and further from the magnetic head assembly. The magnetic recording media guide is movable in a direction perpendicular to a direction that the magnetic recording media moves past the magnetic head assembly. The magnetic recording media guide is stationary in relation to the magnetic recording media when the magnetic recording media moves past the magnetic head assembly while a magnetic head is positioned to read data from or write data to the magnetic recording media. Additionally, the magnetic recording media guide can planarize the magnetic recording media surface on the magnetic head.

It is noted that the recording media being shown in the figures as being embedded in the recording device is for illustration purposes only. Various embodiments are directed to a magnetic recording device with either embedded media or accepts insertable media, e.g., in the form a cartridge or cassette such as that used in LTO. As an example, where the recording device accepts insertable media, the media reel arrangements may be different from those being illustrated.

Figure 1A:
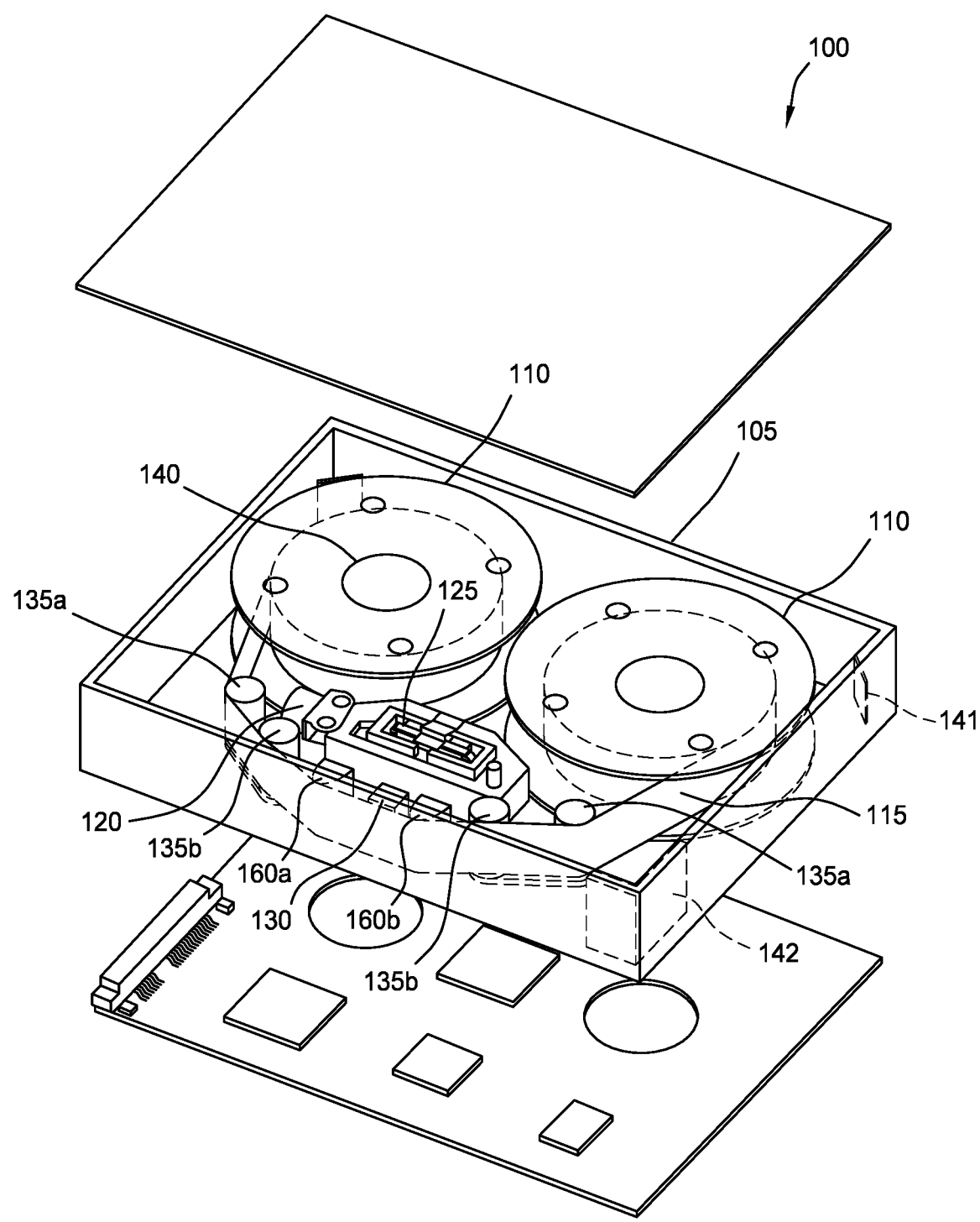
FIGS. 1A-1F are schematic illustrations of a magnetic recording device, according to various embodiments.
Figure 1B:
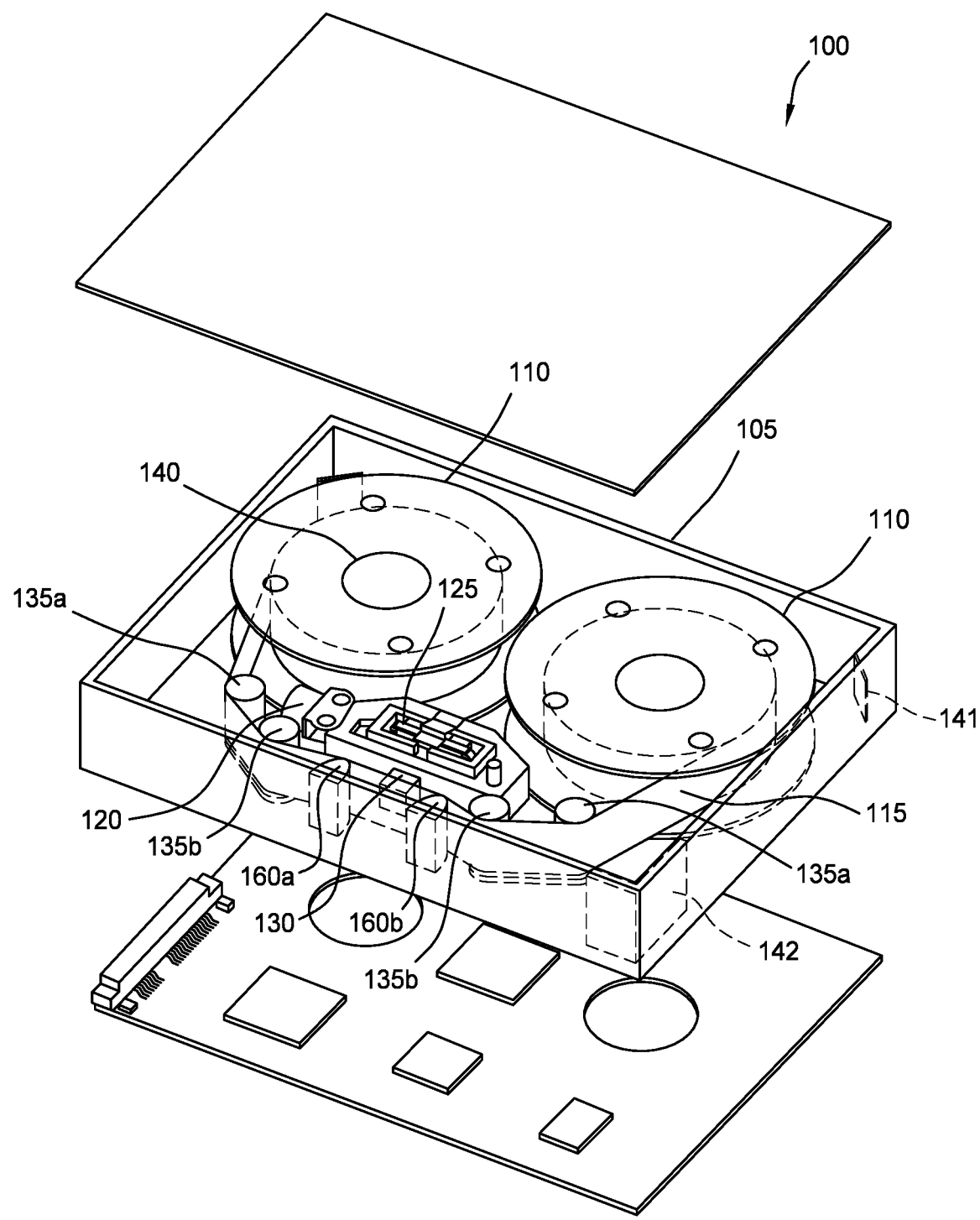
Figure 1C:
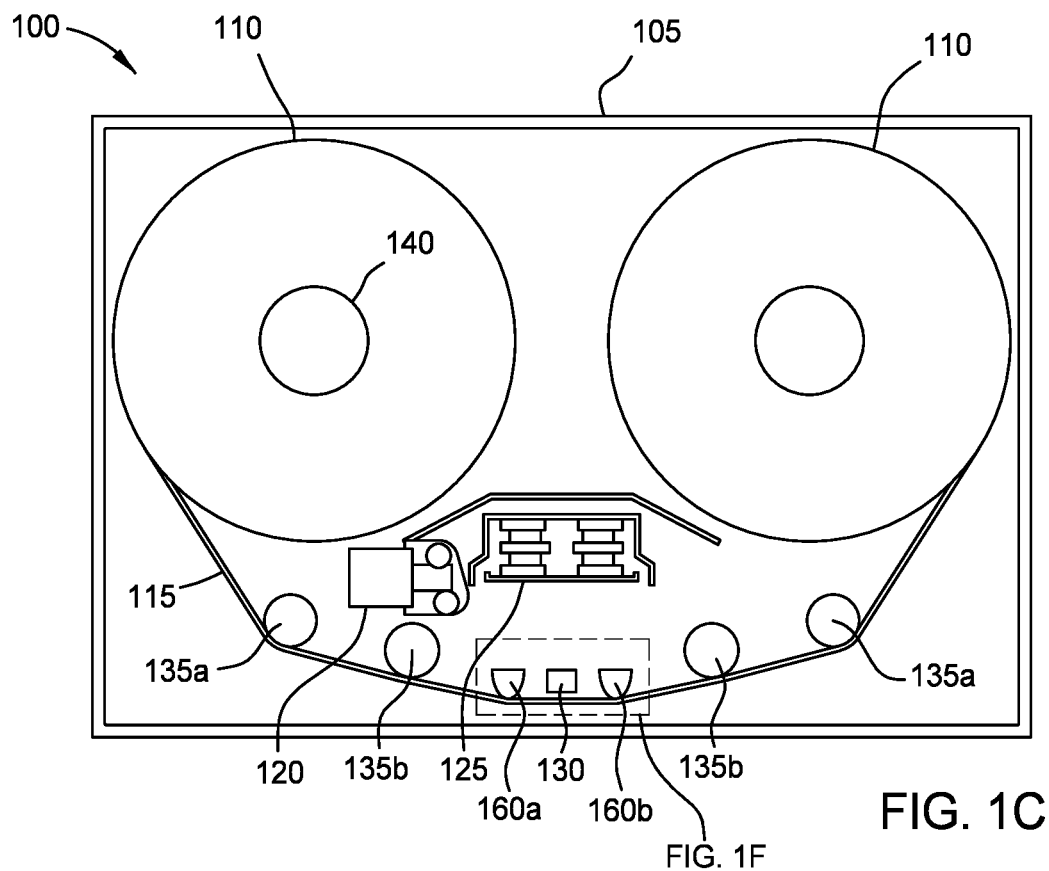
Figure 1D:
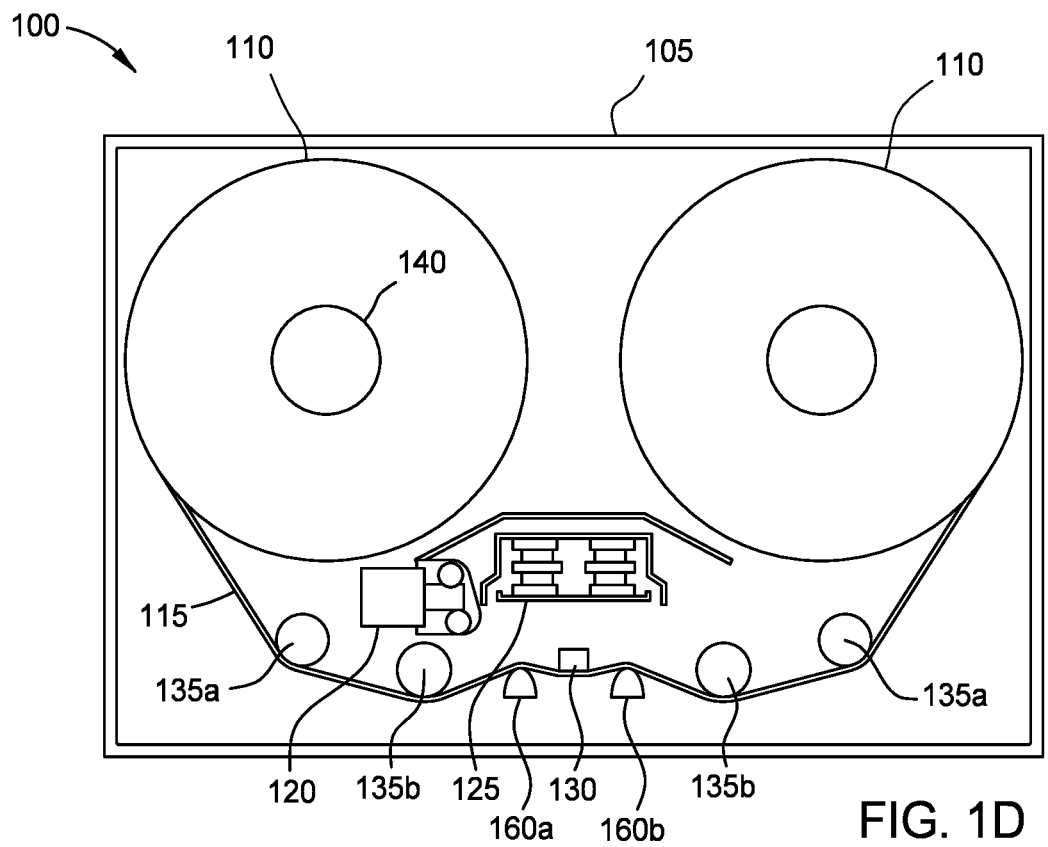
Figure 1E:
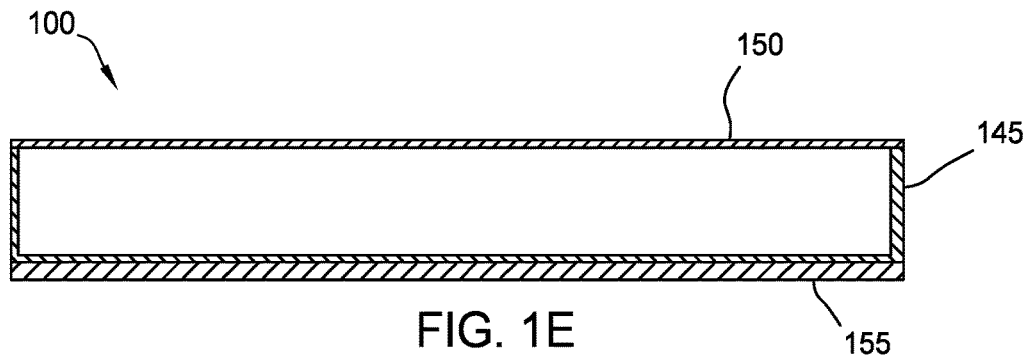
Figure 1F:
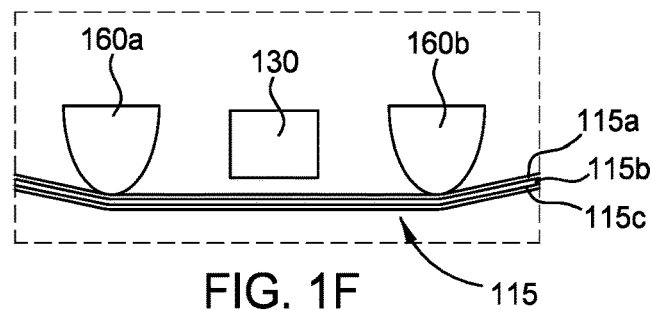

FIGS. 1A-1F are schematic illustrations of a magnetic recording device, according to various embodiments. The magnetic recording device 100, in FIGS. 1A-1D, comprises a casing 105, one or more magnetic media reels 110, magnetic media 115, one or more motors (e.g., a stepping motor 120), a voice coil motor (VCM 125, etc.), a magnetic head assembly 130 with one or more read and write magnetic heads (not shown), magnetic media guide rollers 135a, 135b, and magnetic recording media guides 160a and 160b. It is noted that while the magnetic head assembly 130 is shown as a component in various figures, in some embodiments it may comprise multiple modules each may in turn include multiple read and/or write magnetic heads. The magnetic recording media guides 160a and 160b may be collectively referred to as magnetic recording media guides 160. The magnetic recording media guides 160a and 160b may alternatively be referred to as tape guides 160a and 160b for exemplary purposes. The magnetic media 115 may be referred to as tape media 115 for exemplary purposes. The magnetic media reels 110 may be referred to as tape reels for exemplary purposes. In FIG. 1E, the printed circuit board assembly ("PCBA") 155 is mounted on an external surface of the casing. FIG. 1F depicts a cutaway view of the composition of the magnetic media 115 according to one implementation.

In FIG. 1A and FIG. 1C, two media reels 110 are placed in the interior cavity of the casing 105, with the center of the two media reels 110 in-line with one another and on the same level in the cavity and with the magnetic head assembly 130 located in the middle and below the two media reels 110. Magnetic media reel motors 140 located in the spindles of the media reels 110 may operate to wind and unwind the magnetic media 115 in the magnetic media reels 110. Each magnetic media reel 110 may also incorporate a tape folder to ensure the magnetic recording media 115 is wound neatly onto the reel 110. Each magnetic media guide roller 135a and 135b may be referred to as guide rollers 135a and 135b for exemplary purposes. The guide rollers 135a and 135b may rotate about an axis to guide the magnetic recording media 115 past the magnetic recording media guides 160a and 160b and the magnetic head assembly 130. The magnetic recording media guides 160a and 160b are disposed on either side of the magnetic head assembly 130 and between the magnetic head assembly 130 and the guide rollers 135b. In one embodiment, the magnetic recording media guides 160a and 160b are disposed on the same side of the magnetic recording media 115 as the magnetic head assembly 130.

In FIG. 1B and FIG. 1D, two media reels 110 are placed in the interior cavity of the casing 105, with the center of the two media reels 110 in-line with one another and on the same level in the cavity and with the magnetic head assembly 130 located in the middle and below the two media reels 110. Magnetic media reel motors 140 located in the spindles of the media reels 110 may operate to wind and unwind the magnetic media 115 in the magnetic media reels 110. Each magnetic media reel 110 may also incorporate a tape folder to ensure the magnetic media 115 is wound neatly onto the reel 110. Each guide roller 135a and 135b may also rotate about an axis to guide the magnetic recording media 115 past the magnetic recording media guides 160a and 160b and the magnetic head assembly 130. The magnetic recording media guides 160a and 160b are placed on either side of the magnetic head assembly and between the magnetic head assembly 130 and the guide rollers 135b. In one embodiment, the magnetic recording media guides 160a and 160b are placed on the opposite side of the magnetic recording media 115 as the magnetic head assembly 130.

Magnetic recording media guides 160a and 160b can reduce the load applied to the magnetic head assembly. In some embodiments, the magnetic recording media guides may reduce the amount of wear to the one or more magnetic heads and improve the magnetic head's durability. Magnetic recording media 115 from the magnetic media reels 110 are biased against the magnetic media guide rollers 135a, 135b, collectively referred to as magnetic media guide rollers 135, with the two magnetic media guide rollers 135a furthest away from the magnetic head assembly 130 serving to change the direction of the magnetic media and the two magnetic media guide rollers 135b closest to the magnetic head assembly 130 directing the magnetic recording media 115 towards the magnetic recording media guides 160a and 160b and the magnetic head assembly 130.

As illustrated in FIG. 1A and FIG. 1C, the magnetic media guide rollers 135 are on the same side (i.e., left or right of the center axis of the long edge of the device) of the magnetic recording media 115 as the magnetic head assembly 130. The number of guide rollers illustrated in FIGS. 1A-1D are not intended to be limiting, and a greater or a lesser number of rollers may be used in other embodiments. As illustrated in FIG. 1A and FIG. 1C, the magnetic recording media guides 160a and 160b are on the lubricant layer side of the magnetic media 115 and on either side of the magnetic head assembly 130. More specifically, the media guides 160a, 160b are on the same side of the magnetic media 115 as the magnetic head assembly 130. In FIG. 1B and FIG. 1D, the magnetic recording media guides 160a and 160b are on the base film side of the magnetic media 115 (i.e., on the opposite side of the magnetic recording media as the magnetic head assembly 130) and on either side of the magnetic head assembly 130. The number of magnetic recording media guides 160a, 160b illustrated in FIGS. 1A-1D are not intended to be limiting, and a greater or lesser number of magnetic media guides may be used in other embodiments. The placement of the magnetic recording media guides illustrated in FIGS. 1A-1D are not intended to be limiting. For example, it is contemplated that magnetic media guide 160a and magnetic media guide 160b may be on opposite sides of the magnetic media 115 such that only one magnetic media guide 160a or 160b is on the same side of the magnetic media 115 as the magnetic head assembly 130.

In FIG. 1A and FIG. 1B, the casing 105 comprises one or more particle filters 141 and/or desiccants 142 to help maintain the environment in the casing. For example, if the casing is not airtight, the particle filters 141 and/or desiccants 142 may be placed where airflow is expected. The particle filters 141 and/or desiccants 142 may be placed in one or more corners or in one or more locations away from the moving internal components. For example, the moving magnetic reels 110 may generate internal airflow as the magnetic recording media 115 winds or unwinds, and the particle filters 141 and/or desiccants 142 may be placed within the generated internal airflow.

The placement of the internal components within the casing 105 of the magnetic recording device 100 may be different according to various embodiments. For example, in one embodiment, the magnetic head assembly 130 is internal to the casing 105, such that the magnetic recording media 115 is not exposed outside of the casing 105. Thus, the magnetic recording media 115 does not need to be routed along the edge of the casing and can be freely routed in more compact or otherwise more efficient ways within the casing. The one or more read or write magnetic heads, media reels 110, and magnetic media guides 160a and 160b may be placed in a variety of locations to achieve a more efficient layout, as there is no design requirement to provide external access to the previously mentioned components. Furthermore, it is contemplated that a single media reel 110 may be present within the casing 105 that will interact with a second media reel in a data storage device into which the casing 105 may be inserted. In one embodiment, the two magnetic media guide rollers 135b are separated by a distance of about 42 mm. In another embodiment, the magnetic media guides 160a and 160b are separated by a distance of between about 10 mm to about 25 mm.

In FIG. 1E, the casing 105 comprises a cover 150 and a base 145. The PCBA 155 is attached to the bottom of the external surface of the casing 105 and opposite of the cover 150. Since the PCBA 155 is made of solid state electronics and may be more durable to the environment, the PCBA 155 does not need to be placed inside the casing 105. However, in some embodiments, the PCBA 155 is placed inside the casing 105. The placement of the PCBA 155 on the outside of the casing 105 releases space within the cavity of the magnetic recording device 100 that would otherwise be occupied by the PCBA 155. The space released by the placement of the PCBA 155 may be utilized to place other components, such as filters 141 and/or desiccants 142 to better protect to the internal environment of the magnetic recording device 100.

In FIG. 1F, the composition of the magnetic media 115 comprises a plurality of layers. It is contemplated that the magnetic media 115 may have the same or a similar composition with reference to FIGS. 1A-1D, FIGS. 3A-3D, FIG. 4, FIG. 5, and FIGS. 6A-6D. The plurality of layers of the magnetic media 115 comprises: a lubricant layer 115a, a magnetic layer 115b, and a base film layer 115c. As shown with relation to the magnetic head assembly 130, the magnetic head assembly 130 is on the lubricant layer 115a side of the magnetic media 115.

Figure 2:
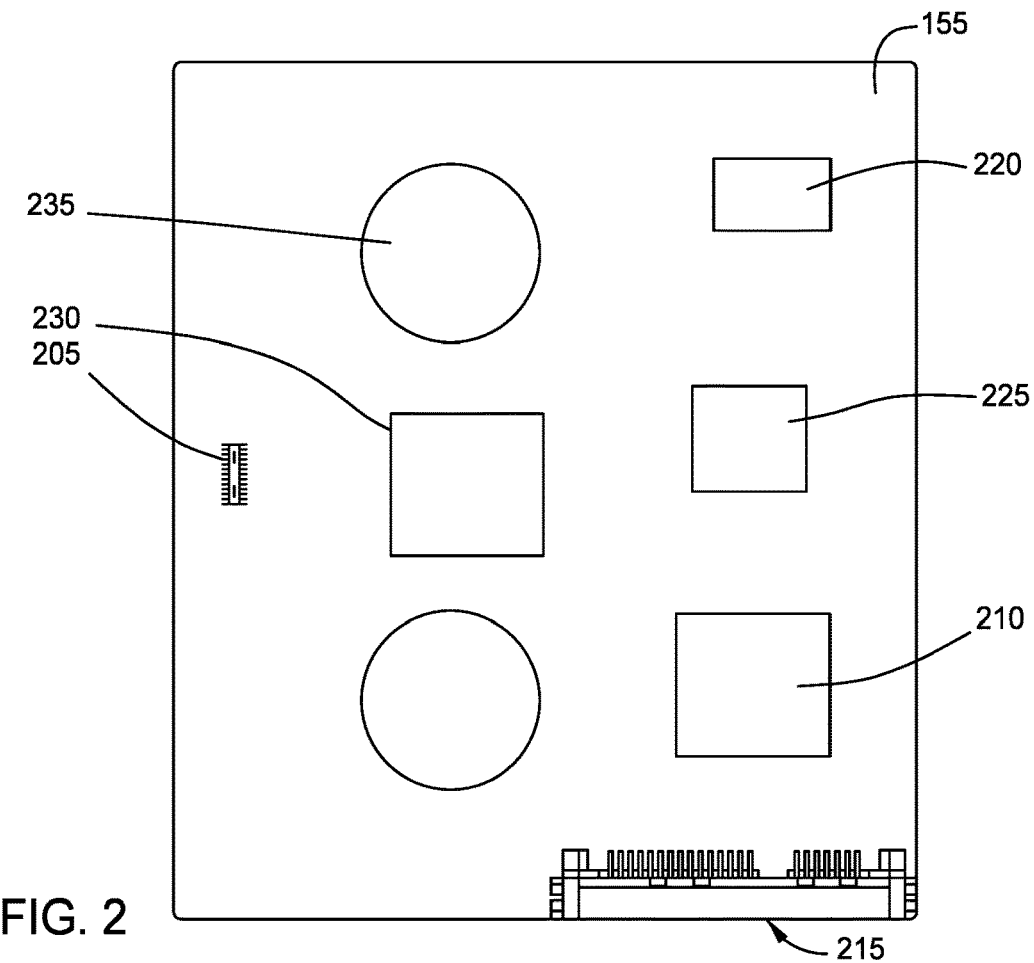
FIG. 2 is a schematic illustration of a Printed Circuit Board Assembly (PCBA), according to one embodiment.

FIG. 2 is a schematic illustration of a PCBA 155, according to one embodiment. The PCBA 155 is attached to the bottom surface of the casing 105, with a connector 205 attaching to contacts or an interface on the bottom surface electrically or electronically connected to internal components in the casing 105. For example, the contacts or the interface may be electronically connected to one or more motors, and/or actuators within the casing 105. In one embodiment, the contacts/interface are built into the casing 105. In another embodiment, the connector 205 can be an electrical feed-through electrically connecting components inside the casing 105 to those on the PCBA 155, while maintaining the hermetic seal of the casing 105.

The PCBA 155 comprises various components, such as one or more controllers, one or more connectors 205, one or more system on chips ("SoC") 210, one or more data interfaces 215 (e.g., Serial ATA ("SATA"), Serial attached SCSI ("SAS"), nonvolatile memory express ("NVMe"), or the like), one or more memory devices 220, Power Large Scale Integration ("PLSI") 225, and/or a data read channel controller 230. One or more cutouts 235 may be added to the PCBA 155 to provide additional space for media reel motors, such as the media reel motors 140 of FIGS. 1A-1D. For example, the portion of the casing 105 above the media reel motors 140 may be raised to provide additional space for the motors. The cutouts 235 may allow for the reduction of the thickness of the magnetic recording device 100 as the PCBA 155 may surround the raised portion of the casing 105.

The PCBA 155 may extend along the entire bottom exterior surface of the casing 105 or may only partially extend along the surface, depending on the space requirements of the various magnetic recording device components. In some embodiments, a second PCBA (not shown) may be located internally in the casing 105 and be in communication with the first PCBA 155, for example, via the connector 205.

In various embodiments, a controller on the PCBA 155 controls the read and write operations of the magnetic recording device 100. The controller may engage the media reel motors 140 and cause the media reels 110 to wind the magnetic recording media 115 forwards or backwards. The controller may further use the VCM and the stepping motor, such as the VCM 125 and the stepping motor 120 of FIGS. 1A-1D, to control the placement of the one or more read/write tape heads above the tape media 115. The controller may also control the input/output of data to or from the magnetic recording device 100 through one or more interfaces 215, such as SATA or SAS.

FIGS. 3A-3D are schematic illustrations of a magnetic recording media guide support system, according to various embodiments. The tape guides 160a and 160b may be the magnetic recording media guides of FIGS. 1A-1D. Tape guides 160a and 160b may operate to move between a first position and a second position. The first position may operate to space the tape media 115 from the tape head assembly 130. The second position may operate to permit the tape media 115 to be in contact with the tape head assembly 130. The tape media 115 moves in a direction perpendicular to the x-axis of the tape guides. The tape guides 160a and 160b are stationary relative to the tape media 115 when the tape guides are holding the tape media 115 away from the tape 130 or permitting the tape media 115 to be in contact with the tape head assembly 130. The tape guides 160a and 160b are movable relative to the tape media in a direction perpendicular to a direction that the tape media 115 moves. Stated another way, the tape guides 160a, 160b move along the x-axis while the tape media 115 is movable along the y-axis.

Figure 3A:
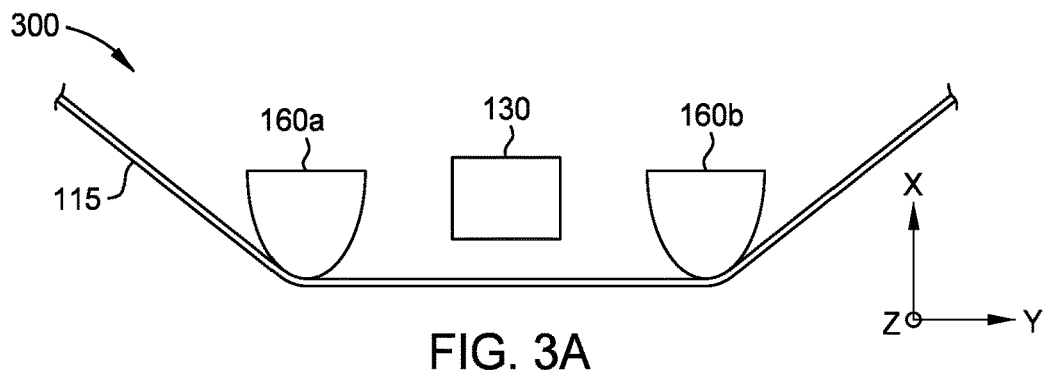
FIGS. 3A-3D are schematic illustrations of a magnetic recording media guide support system according to various embodiments.

In the arrangement 300 shown in FIG. 3A, the tape guides 160a and 160b function to hold the tape media 115 away from the tape head assembly 130. The tape head assembly 130 and the tape guides 160a and 160b are positioned on the lubricant side of the tape media 115. When in operation, the tape media 115 moves in a direction perpendicular to the x-axis (i.e., moves in the y-axis) of the tape guides 160a and 160b. The tape guides 160a and 160b are stationary relative to the tape media 115 when the tape guides are in an unload position to hold the tape media 115 away from the tape head assembly 130. The tape guides 160a and 160b may be in constant contact with the tape media 115. The tape guides 160a and 160b are movable relative to the tape media 115 in a direction perpendicular to a direction that the tape media 115 moves. Stated another way, the tape media 115 moves in the direction of the y-axis during operation while the tape guides 160a, 160b are movable along the x-axis.

Figure 3B:
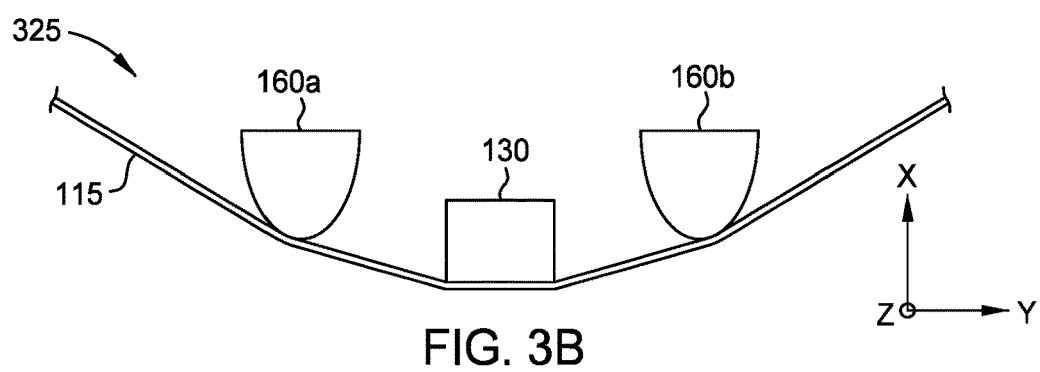

In the arrangement 325 shown in FIG. 3B, the tape guides 160a and 160b function to allow the tape media 115 to be in contact with the tape head assembly 130. Relative to FIG. 3A, the tape guides 160a, 160b have moved in the positive x-axis to permit the tape media 115 to be lowered into contact with the tape head assembly 130. Alternatively, it is contemplated that the tape guides 160a, 160b may be stationary while the tape head assembly 130 moves. The tape head assembly 130 and the tape guides 160a and 160b may be positioned on the lubricant side of the tape media 115. When in operation, the tape media 115 moves in a direction perpendicular to the x-axis (i.e., the y-axis) of the tape guides. The tape guides 160a and 160b are stationary relative to the tape media 115 when the tape guides are in a load position to allow the tape media 115 to be in contact with the tape head assembly 130. The tape guides 160a and 160b may be in constant contact with the tape media 115. The tape guides 160a and 160b are movable relative to the tape media in a direction perpendicular to a direction that the tape media 115 moves. Stated another way, the tape media 115 moves in the direction of the y-axis during operation while the tape guides 160a, 160b are movable along the x-axis.

Figure 3C:
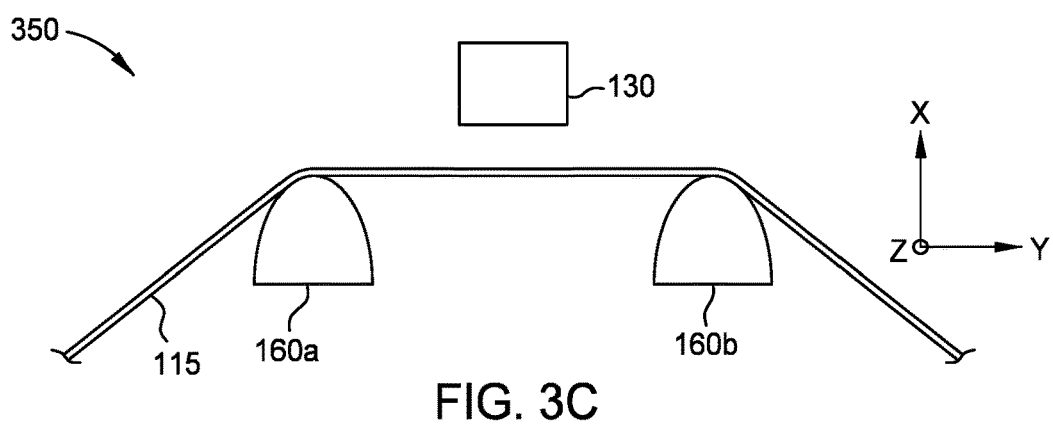

In the arrangement 350 shown in FIG. 3C, the tape guides 160a, 160b function to hold the tape media 115 away from the tape head assembly 130. The tape head assembly 130 and the tape guides 160a and 160b are positioned on opposite sides of the tape media 115. The tape guides 160a and 160b are positioned on the base film layer side. The tape guides 160a and 160b are in constant contact with the tape media 115. The tape media 115 moves in a direction perpendicular to the x-axis of the tape guides (i.e., the y-axis). The tape guides 160a and 160b are stationary relative to the tape media 115 when the tape guides are positioned to provide distance between the tape media 115 and the tape head assembly 130 (i.e., in an unload position). The tape guides 160a and 160b are movable relative to the tape media 115 in a direction perpendicular to a direction that the tape media 115 moves. Stated another way, the tape media 115 moves in the direction of the y-axis during operation while the tape guides 160a, 160b are movable along the x-axis.

Figure 3D:
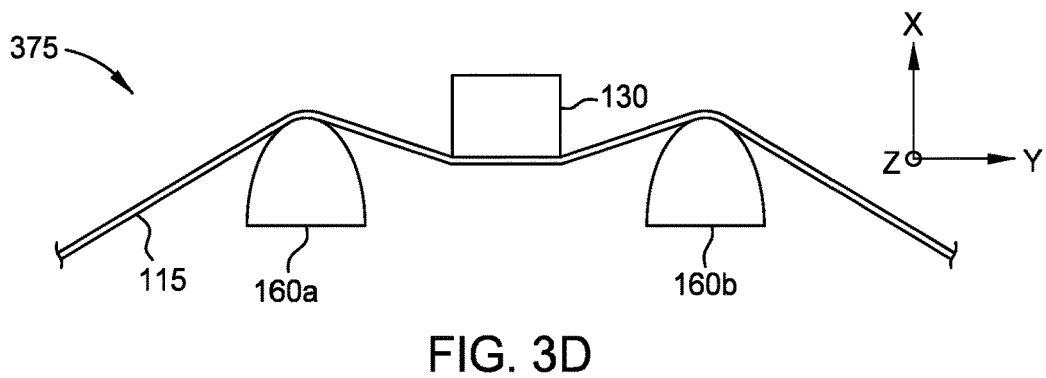

In the arrangement 375 of FIG. 3D, the tape guides 160a and 160b function to hold the tape media 115 in contact with the tape head assembly 130. Relative to FIG. 3C, the tape guides 160a, 160b have moved in the positive x-axis to permit the tape media 115 to be pushed into contact with the tape head assembly 130. Alternatively, it is contemplated that the tape guides 160a, 160b may be stationary while the tape head assembly 130 moves. The tape head assembly 130 and the tape guides 160a and 160b are positioned on opposite sides of the tape media 115. The tape guides 160a and 160b are on the base film layer side. The tape guides 160a and 160b are in constant contact with the tape media 115. The tape media 115 moves in a direction perpendicular to the x-axis of the tape guides (i.e., the y-axis). The tape guides 160a and 160b are stationary relative to the tape media 115 when the tape guides are positioned to provide distance between the tape media 115 and the tape head assembly 130 (i.e. in a load position). The tape guides 160a and 160b are movable relative to the tape media 115 in a direction perpendicular to a direction that the tape media 115 moves. Stated another way, the tape media 115 moves in the direction of the y-axis during operation while the tape guides 160a, 160b are movable along the x-axis.

The magnetic recording media guides 160a and 160b reduce the amount of wear to the tape media 115 and increase the usable area of the tape media 115. More specifically, it is believed that the tape media 115 lubricant thickness may be reduced to improve the recording density of the magnetic recording device and reduce the magnetic spacing between the magnetic head assembly and the tape media. Reducing the spacing between the magnetic head assembly 130 and the magnetic layers of the tape media 115 improves the recording density of the device.

Figure 4:
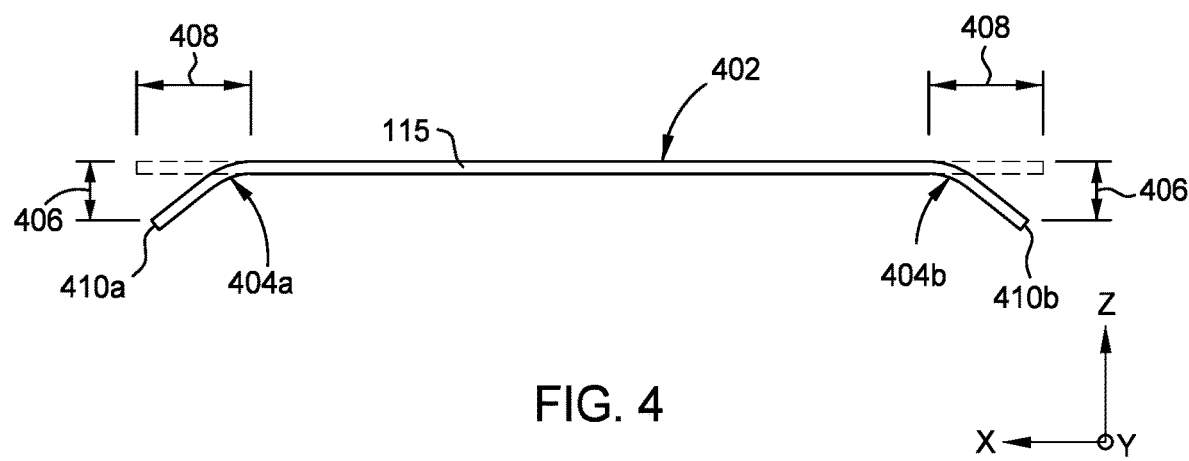
FIG. 4 is a schematic illustration of tape media having an undesired deflection.

In regards to increasing the usable area of the tape media 115, the tape guides 160a, 160b ensure a substantially flat tape media 115 contacting the tape head assembly 130 during read/write operations. More specifically, as the tape media 115 moves from the guide roller 135b to the tape head assembly 130, the edge area of the tape media tends to deflect. FIG. 4 is a schematic illustration of tape media having an undesired deflection. As shown in FIG. 4, the middle portion 402 of the tape media 115 remains relatively flat upon exiting the guide roller 135b before encountering the tape head assembly 130. However, edge portions 404a, 404b of the tape media 115 have deflected along the z-axis. The deflection is typically a distance 406 of 1.4 nm to 1.8 nm in the z-axis direction from the x-axis. The deflection extends a distance 408 of between about 0.4 nm to about 0.7 nm from the ends 410a, 410b of the tape media 115 along the x-axis. The tape guides 160a, 160b ensure the tape media 115 is not deflected when the tape media 115 encounters the tape head assembly 130.

Figure 5:
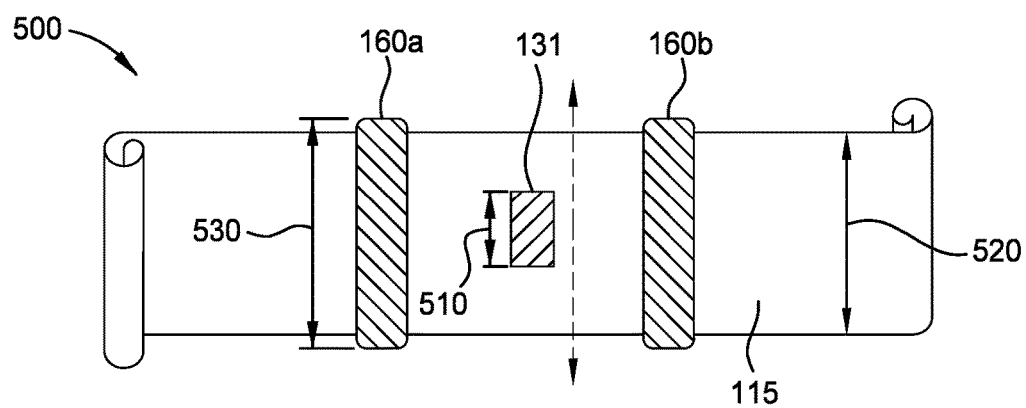
FIG. 5 is a schematic illustration of a magnetic recording media guide relative to a magnetic head and magnetic media, according to one embodiment.

FIG. 5 is a schematic illustration of a magnetic recording media guide arrangement 500, according to one embodiment. In one embodiment, two magnetic recording media guides 160a and 160b are located on both sides of the magnetic head assembly with a magnetic head 131 and on the same side of the tape media 115 as the magnetic head. In another embodiment, two magnetic recording media guides 160a, 160b are located on both sides of the head assembly with a magnetic head 131 on the tape media 115 and opposite the magnetic head 131.

As shown in FIG. 5, the tape head 131 width 510 is significantly smaller than the tape width 520. For example, the tape head 131 width 510 may be less than half or even less than a quarter of the width 520 of the tape media 115. In some embodiments, the magnetic head 131 width 510 may be greater than the tape width 520. In one embodiment, the tape head 131 has a width 510 of between about 5.3 mm and about 5.7 mm while the tape media 115 has a width 520 of between about 12 mm and about 13 mm. The tape guides 160a, 160b, on the other hand, have a length 530 that is greater than a width 520 of the tape media 115. In one embodiment, the length 530 is between about 13 mm and about 15 mm. In one embodiment, the ratio of the width of the tape head to the width of the tape media is from about 5:13 to about 6:12.

Figure 6A:
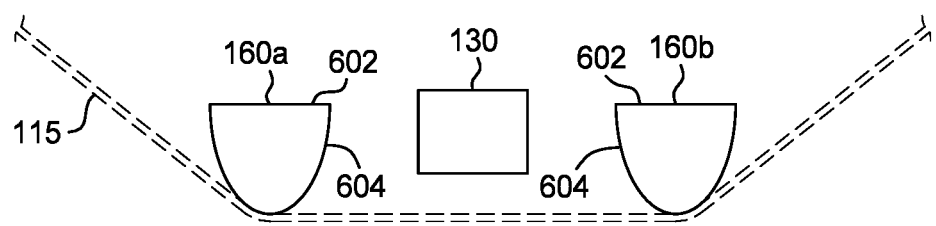
FIGS. 6A-6D are schematic illustrations of tape media guides, according to one embodiment.
Figure 6B:
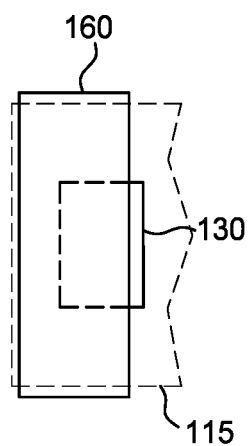
Figure 6C:
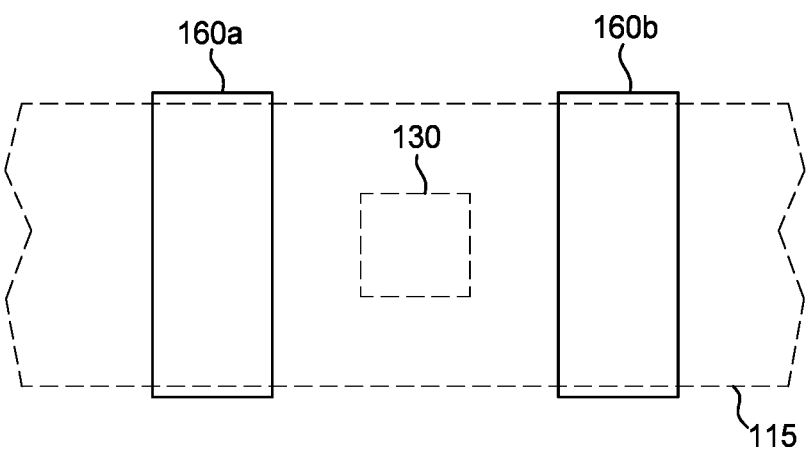
Figure 6D:
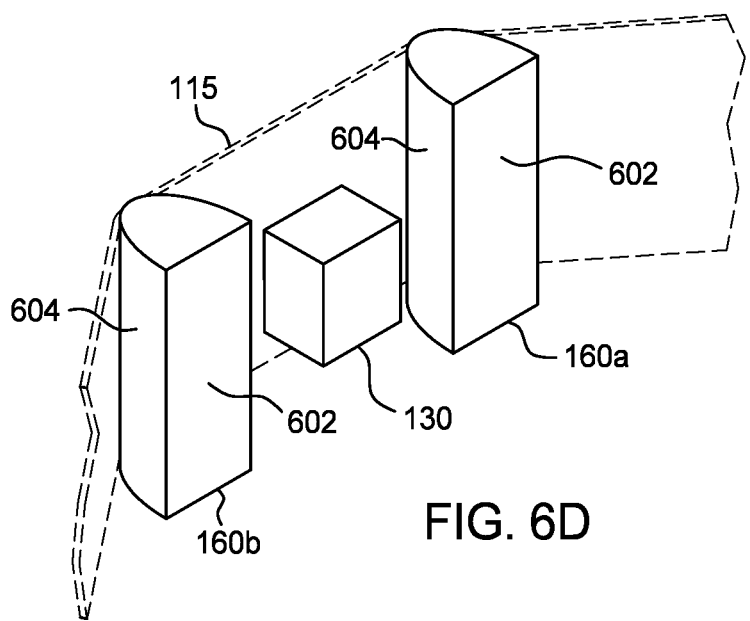

FIGS. 6A-6D are schematic illustrations of tape guides 160a and 160b, according to one embodiment. FIG. 6A is a front view of tape guides 160a and 160b. FIG. 6B is a side view of tape guides 160a, 160b. FIG. 6C is a top view of tape guide 160a, 160b. FIG. 6D is an isometric view of tape guides 160a, 160b. The tape guides 160a and 160b comprise a base surface 602 and a top surface 604 connected to the base surface. The bottom surface 602 is substantially planar, but it is contemplated that other shapes or orientations may be used for the bottom surface 602. In one embodiment, the top surface 604 has a rounded edge. In particular, the top surface 604 has a diameter of curvature value of 5 mm such that the tape media 115 is in contact with between about 3 mm to about 7 mm, such as about 5 mm, of surface of the top surface 604. In another embodiment, the top surface's width may be less than a half of the width of the tape media or even less than a quarter of the width of the tape media 115. The length of the tape guide may be equal to or greater than the width of the tape media 115. In some embodiments, the length of the tape guide may be less than the tape width. In another embodiment, the ratio of the width of tape media in contact with the tape guide to the total width of the tape media is from about 3:13 to about 5:12. In another embodiment, the ratio of the top surface of the tape media guide to the width of the tape head is from about 1:2 to about 1:1.

In one embodiment, the tape guides 160a and 160b are separated by a distance of between about 10 mm and about 25 mm. In another embodiment, the placement assembly of the tape guide assembly may be different to account for desired movement of the tape media relative to the tape head assembly. In another embodiment, the ratio of the distance between the tape guides 160a and 160b to the width of the tape media is a ratio from 10:13 to 25:12. The tape guides 160a and 160b are shaped to provide low friction and low stiction to the tape media 115. The tape guides 160a, 160b may be formed with any suitable material to provide support to the tape media 115. In one embodiment, the tape guides are formed with stainless steel or ceramic material. In one embodiment, the tape guides are on the lubricant layer side of the tape media 115. In one embodiment, the tape guides are on the base layer side of the tape media 115.

By using a tape media guide support system, the load applied to the magnetic head assembly, the magnetic head, and tape media may be reduced to extend the lifespan of the magnetic head assembly, the magnetic head, and tape media, and increases the recording density. Additionally, tape media deflection can be reduced or even eliminated such that the entirety of the tape media may be used edge to edge for storing data.

In one embodiment, a magnetic recording device comprises: a reel configured to unroll a magnetic recording media therefrom or roll the magnetic recording media thereto; a magnetic head assembly configured to read data from the magnetic recording media or write data to the magnetic recording media; at least one guide roller rotatable about an axis and configured to guide the magnetic recording media past the magnetic head assembly; and at least one magnetic recording media guide disposed between the magnetic head assembly and the at least one guide roller, wherein the at least one magnetic recording media guide is configured to move between a first position to space the magnetic recording media from the magnetic head assembly and a second position to permit the magnetic recording media to be in contact with the magnetic head assembly.

The magnetic recording media guide includes a first guide and a second guide and wherein the magnetic head assembly is disposed between the first guide and the second guide. The magnetic recording media guide and the magnetic head assembly are disposed on an opposite side of the magnetic recording media. The magnetic recording media guide and the magnetic head assembly are disposed on a same side of the magnetic recording media. The magnetic recording media guide is configured to contact the magnetic recording media when the magnetic head assembly is spaced from the magnetic recording media. The magnetic recording media guide is configured to contact the magnetic recording media when the magnetic head assembly is in contact with the magnetic recording media. The magnetic recording media guide is shaped such that at least 3 mm of the magnetic recording media contacts the magnetic recording media guide while the magnetic recording media is moving past the magnetic head assembly. The magnetic recording media guide has a length in a direction perpendicular to a direction that the magnetic recording media moves past the magnetic head assembly, the magnetic recording media has a width in a direction perpendicular to the direction that the magnetic recording media moves past the magnetic head assembly, and wherein the length is greater than the width. The magnetic recording media guide has a surface roughness of 0.02-0.03 microns. The magnetic recording media guide is stainless steel or ceramic.

In another embodiment, a magnetic recording device comprises: a tape media for storing data; a tape head for reading data from or writing data to the tape media; a guide roller configured to rotate about an axis, wherein the tape media is stationary relative to the guide roller when the guide roller rotates about the axis; and a tape guide disposed between the guide roller and the tape head, wherein the tape guide is stationary relative to the tape media when the tape media moves past the tape head while the tape head is positioned to read data from or write data to the tape media. The tape guide comprises a first tape guide element and a second tape guide element, wherein the first tape guide element and the second tape guide element are spaced apart by a distance of between about 10 mm and about 25 mm. The tape guide is movable relative to the tape media in a direction perpendicular to a direction that the tape media moves. The tape media has a substrate and a lubricant layer on the substrate and wherein both the tape guide and the tape head are positioned to contact the lubricant layer. The tape guide is configured to exert a pressure of between about 0.3 N and about 0.6 N on the tape media. The tape guide comprises a first tape guide element and a second tape guide element, and wherein the first tape guide element and the second tape guide element are movable in tandem in a direction perpendicular to a direction that the tape media moves past the tape head.

In another embodiment, a magnetic recording device comprises: an enclosure; at least one tape reel disposed within the enclosure, wherein the at least one tape reel is configured to wind a tape media thereto or unwind a tape media therefrom; a tape head for reading data from the tape media or writing data to the tape media; and means to planarize the tape media on the tape head, wherein the means to planarize the tape media on the tape head is disposed between the at least one tape reel and the tape head. The tape media has a deflection at an edge of the tape media prior to coming into contact with the means to planarize the tape media on the tape head. The deflection is between about 1 mm and about 2 mm from planar, or about 0.5 mm and about 1.0 mm from the edge into the tape media.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording device, comprising:
    a reel configured to unroll a magnetic recording media therefrom or roll the magnetic recording media thereto;
    a magnetic head assembly configured to read data from the magnetic recording media or write data to the magnetic recording media;
    at least one guide roller rotatable about an axis and configured to guide the magnetic recording media past the magnetic head assembly; and
    at least one magnetic recording media guide disposed between the magnetic head assembly and the at least one guide roller, wherein the at least one magnetic recording media guide is configured to move between a first position to space the magnetic recording media from the magnetic head assembly and a second position to permit the magnetic recording media to be in contact with the magnetic head assembly, and wherein the at least one magnetic recording media guide is shaped such that a ratio of the magnetic recording media in contact with the at least one magnetic recording media guide while the magnetic recording media is moving past the magnetic head assembly is from 1:2 to 1:1.

2. The magnetic recording device of claim 1, wherein the at least one magnetic recording media guide comprises a first guide and a second guide and wherein the magnetic head assembly is disposed between the first guide and the second guide.

3. The magnetic recording device of claim 1, wherein the at least one magnetic recording media guide and the magnetic head assembly are disposed on an opposite side of the magnetic recording media.

4. The magnetic recording device of claim 1, wherein the at least one magnetic recording media guide and the magnetic head assembly are disposed on a same side of the magnetic recording media.

5. The magnetic recording device of claim 1, wherein the at least one magnetic recording media guide is configured to contact the magnetic recording media when the magnetic head assembly is spaced from the magnetic recording media.

6. The magnetic recording device of claim 1, wherein the at least one magnetic recording media guide is configured to contact the magnetic recording media when the magnetic head assembly is in contact with the magnetic recording media.

7. The magnetic recording device of claim 1, wherein the at least one magnetic recording media guide has a length in a direction perpendicular to a direction that the magnetic recording media moves past the magnetic head assembly, the magnetic recording media has a width in a direction perpendicular to the direction that the magnetic recording media moves past the magnetic head assembly, and wherein the length is greater than the width.

8. The magnetic recording device of claim 1, wherein the at least one magnetic recording media guide has a surface roughness of 0.02 to 0.03 microns.

9. The magnetic recording device of claim 1, wherein the at least one magnetic recording media guide comprises stainless steel or ceramic.

10. A magnetic recording device, comprising:
    a tape media for storing data;
    a tape head for reading data from or writing data to the tape media;
    a guide roller configured to rotate about an axis, wherein the tape media is stationary relative to the guide roller when the guide roller rotates about the axis; and
    a tape guide disposed between the guide roller and the tape head, wherein the tape guide is stationary relative to the tape media when the tape media moves past the tape head while the tape head is positioned to read data from or write data to the tape media.

11. The magnetic recording device of claim 10, wherein the tape guide comprises a first tape guide element and a second tape guide element, wherein a ratio of a distance between the first tape guide element and the second tape guide element to a width of the tape media is from 10:13 to 25:12.

12. The magnetic recording device of claim 10, wherein the tape guide is movable relative to the tape media in a direction perpendicular to a direction that the tape media moves.

13. The magnetic recording device of claim 10, wherein the tape media comprises a substrate and a lubricant layer on the substrate, and wherein both the tape guide and the tape head are positioned to contact the lubricant layer.

14. The magnetic recording device of claim 10, wherein the tape guide is configured to exert a pressure of between about 0.3 N and about 0.6 N on the tape media.

15. The magnetic recording device of claim 10, wherein the tape guide comprises a first tape guide element and a second tape guide element, and wherein the first tape guide element and the second tape guide element are movable in tandem in a direction perpendicular to a direction that the tape media moves past the tape head.

16. A magnetic recording device, comprising:
    an enclosure;
    at least one tape reel disposed within the enclosure, wherein the at least one tape reel is configured to wind a tape media thereto or unwind a tape media therefrom;
    a tape head for reading data from the tape media or writing data to the tape media; and
    means to planarize the tape media on the tape head, wherein the means to planarize the tape media on the tape head is disposed between the at least one tape reel and the tape head, and wherein the tape media has a deflection at an edge of the tape media prior to coming into contact with the means to planarize the tape media on the tape head.

17. The magnetic recording device of claim 16, wherein the deflection is between about 1 mm and about 2 mm from planar.

18. The magnetic recording device of claim 16, wherein the deflection is between about 0.5 mm and about 1.0 mm from the edge into the tape media.

19. A magnetic recording device, comprising:
    a reel configured to unroll a magnetic recording media therefrom or roll the magnetic recording media thereto;

a magnetic head assembly configured to read data from the magnetic recording media or write data to the magnetic recording media;

at least one guide roller rotatable about an axis and configured to guide the magnetic recording media past the magnetic head assembly; and at least one magnetic recording media guide disposed between the magnetic head assembly and the at least one guide roller, wherein the at least one magnetic recording media guide is configured to move between a first position to space the magnetic recording media from the magnetic head assembly and a second position to permit the magnetic recording media to be in contact with the magnetic head assembly, wherein the at least one magnetic recording media guide has a length in a direction perpendicular to a direction that the magnetic recording media moves past the magnetic head assembly, the magnetic recording media has a width in a direction perpendicular to the direction that the magnetic recording media moves past the magnetic head assembly, and wherein the length is greater than the width.

20. A magnetic recording device, comprising:

a reel configured to unroll a magnetic recording media therefrom or roll the magnetic recording media thereto;

a magnetic head assembly configured to read data from the magnetic recording media or write data to the magnetic recording media;

at least one guide roller rotatable about an axis and configured to guide the magnetic recording media past the magnetic head assembly; and at least one magnetic recording media guide disposed between the magnetic head assembly and the at least one guide roller, wherein the at least one magnetic recording media guide is configured to move between a first position to space the magnetic recording media from the magnetic head assembly and a second position to permit the magnetic recording media to be in contact with the magnetic head assembly, and wherein the at least one magnetic recording media guide has a surface roughness of 0.02 to 0.03 microns.

* * * * *